United States Patent
Lee et al.

(10) Patent No.: US 6,795,797 B2
(45) Date of Patent: Sep. 21, 2004

(54) METHOD AND APPARATUS FOR MEASURING CPU TASK OCCUPANCY RATE IN A REAL-TIME SYSTEM

(75) Inventors: Hong-Do Lee, Kyunggi-Do (KR); Young Gyoung Kwak, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 10/227,270

(22) Filed: Aug. 26, 2002

(65) Prior Publication Data

US 2003/0046030 A1 Mar. 6, 2003

(30) Foreign Application Priority Data

Sep. 6, 2001 (KR) .................................. 2001-0054671

(51) Int. Cl.$^7$ .............................................. G06F 9/00
(52) U.S. Cl. .................. 702/186; 718/102; 718/103; 718/108; 718/104
(58) Field of Search ................................ 718/100–108; 710/10, 36, 44, 45, 112; 365/194; 702/186; 709/1, 100, 102, 103, 104, 105, 106, 107

(56) References Cited

U.S. PATENT DOCUMENTS

| | | | | |
|---|---|---|---|---|
| 5,095,427 A | * | 3/1992 | Tanaka et al. | 709/1 |
| 5,928,321 A | * | 7/1999 | Ozcelik et al. | 709/1 |
| 6,105,048 A | * | 8/2000 | He | 709/100 |
| 6,182,238 B1 | * | 1/2001 | Cooper | 714/2 |
| 6,513,124 B1 | * | 1/2003 | Furuichi et al. | 713/322 |
| 2002/0032715 A1 | * | 3/2002 | Utsumi | 709/103 |
| 2002/0041527 A1 | * | 4/2002 | Tanaka et al. | 365/200 |
| 2002/0087611 A1 | * | 7/2002 | Tanaka et al. | 709/1 |
| 2002/0089881 A1 | * | 7/2002 | Akioka et al. | 365/194 |
| 2003/0187612 A1 | * | 10/2003 | Miyake | 702/176 |

FOREIGN PATENT DOCUMENTS

| | | | | | |
|---|---|---|---|---|---|
| JP | 63269239 A | * | 11/1988 | | G06F/11/34 |
| JP | 04252638 A | * | 9/1992 | | H04L/29/10 |
| JP | 05151004 A | * | 6/1993 | | G06F/9/46 |
| JP | 05181711 A | * | 7/1993 | | G06F/11/32 |
| JP | 10011333 A | * | 1/1998 | | G06F/11/34 |
| JP | 11327927 A | * | 11/1999 | | G06F/9/46 |
| JP | 2003015888 A | * | 1/2003 | | G06F/9/46 |

\* cited by examiner

*Primary Examiner*—Marc S. Hoff
*Assistant Examiner*—Carol S W Tsai
(74) *Attorney, Agent, or Firm*—Fleshner & Kim, LLP

(57) ABSTRACT

An apparatus for measuring a CPU occupancy rate of a task in a real-time system. The apparatus includes a task register unit registering a task to be measured in flag bits, and a task selecting module selecting and outputting a bit address of the task having a high priority of the flag bit among the set flag bits. A count signal generating unit processing the bit address inputted from the task selecting module to generate a count signal, and a count unit counting an execution time of the task in accordance with the count signal are further included. A CPU sets the flag bit when the task is executed and calculates an execution number and the CPU occupancy rate of the task based on a count value of the count unit.

16 Claims, 6 Drawing Sheets

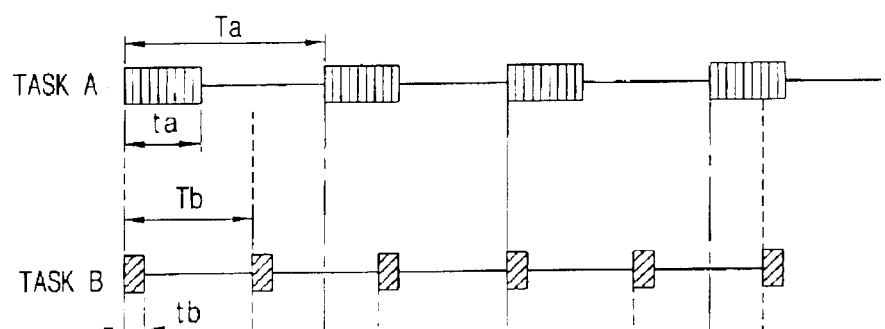
FIG. 2A BACKGROUND ART  TASK A
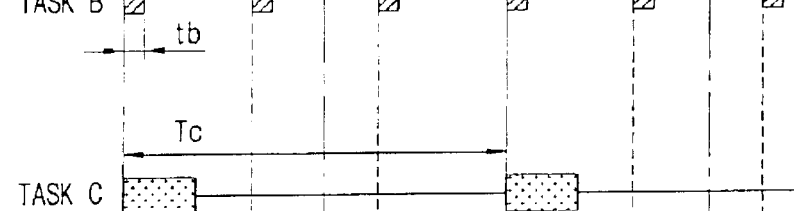
FIG. 2B BACKGROUND ART  TASK B
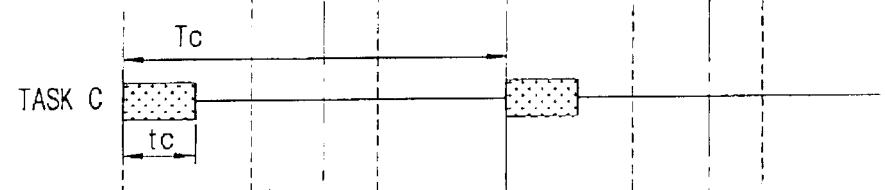
FIG. 2C BACKGROUND ART  TASK C
FIG. 2D BACKGROUND ART  ENTIRE TASKS
TASK PRIORITY: TASK A > TASK B > TASK C

TASK A

TASK B

TASK C

ENTIRE TASKS

TASK PRIORITY: TASK A > TASK B > TASK C

FIG. 5A TASK A 
FIG. 5B TASK B 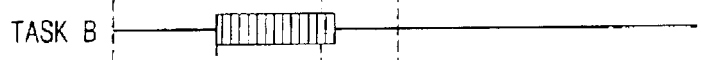
FIG. 5C TASK C 
FIG. 5D REAL EXECUTION TIME OF TASK A,B,C 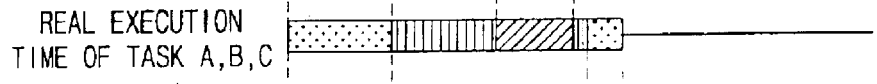
FIG. 5E BIT 0 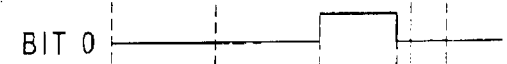
FIG. 5F BIT 1 
FIG. 5G BIT 2 
FIG. 5H OUTPUT OF TASK SELECTING MODULE 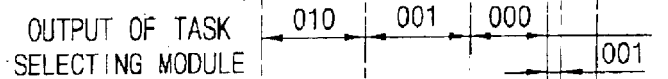
FIG. 5I OUTPUT OF 21a 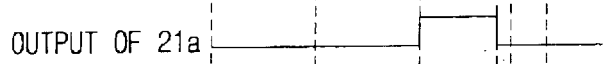
FIG. 5J OUTPUT OF 21b 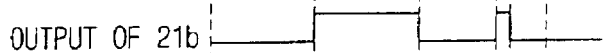
FIG. 5K OUTPUT OF 21c 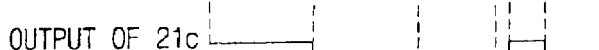
TASK PRIORITY: TASK A>TASK B>TASK C

METHOD AND APPARATUS FOR MEASURING CPU TASK OCCUPANCY RATE IN A REAL-TIME SYSTEM

FIELD OF THE INVENTION

The present invention relates to a real-time system, and more particularly, to an apparatus and method for measuring a CPU occupancy rate of a task in a real-time system.

BACKGROUND OF THE RELATED ART

Generally, a real-time system, such as a digital cross-connect system (DCS), loads software to its central process unit (CPU) to construct or monitor a transmission line. The software processes a plurality of tasks, such as switching, alarming, and the like in real time. Each of the tasks has its own priority and cycle set to be absolutely executed in the determined cycle. Hence, the real-time system executing a plurality of tasks needs to carry out a task schedule of assignment priorities, execution times, and proper cycles of the tasks.

The schedule used in the real-time system is divided into a rate monotonic (RM) scheduling according to the priority of the corresponding task, an earliest deadline first EDF) scheduling, and a weighted fair queuing (WFQ) scheduling, which shares CPU according to a schedule ratio.

FIG. 1 illustrates a schematic block diagram of a real-time system by RM scheduling according to a related art. As shown in FIG. 1, a real-time system 10, a DCS includes a ROM 11 storing a scheduling-related program, a RAM 12 downloading a program read by the ROM 11, and a CPU 13 executing a plurality of tasks in accordance with the program downloaded to the RAM 12. The DCS carries out a data communication with an external transmission system 20.

In operation of the above described real-time system, the CPU 13 downloads the program relating to an RM scheduling from the ROM 11 to the RAM 12, and then executes a task associated with the RM scheduling system in accordance with the corresponding downloaded program.

In the case of more than one task associated with the RM scheduling system, the priorities of tasks A, B, and C shown in FIG. 2 are set as task A>task B>task C by the RM scheduling. The CPU 13 executes the task A of the highest priority and, subsequently carries out task B and task C sequentially. While the task C is being executed and task B with higher priority than task C needs to be executed, the CPU 13 will stop executing task C and execute task B first, then carries out the rest of the task C, which was previously processed and not yet furnished. By the same token, when a plurality of tasks are waiting to be executed by the RM scheduling system, the real-time system should be designed to carry out all of the tasks in balance based on their priorities, cycles, and a quantity of execution contents.

For instance, referring to FIG. 3, if the cycles of the tasks are called Ta, Tb, and Tc and execution times of the tasks are set up as ta, tb, and tc, respectively, the CPU occupancy rates of the tasks A, B, and C become ta/Ta, tb/Tb, and tc/Tc, respectively. In this case, a total CPU occupancy rate (ta/Ta+tb/Tb+tc/Tc) of the tasks should be smaller than 1.

However, the fact that the total CPU occupancy rate is smaller than 1 fails to secure that each of the tasks is executed in its cycle properly. This is because tasks having low priority fail to be executed in their cycles and very too often are delayed if some tasks having high priority occupy the corresponding cycle. For instance, if the tasks A and B having higher priorities occupy the CPU 13 already, the task C having the lowest priority, as shown in the entire tasks of FIG. 3, fails to be executed in its cycle Tc, and this failure is hardly detected.

Moreover, even if several tasks are properly executed in their cycles in the real-time system according to the related art, it is impossible to measure the CPU occupancy rate of each of the tasks. It is also difficult to measure the CPU occupancy rate when the CPU is demanded to carry out lots of work or to generate a supplementary routine. The task usually fails to share the CPU with other tasks.

Unfortunately, the real-time system according to the related art is unable to check if each task is correctly executed in accordance with the schedule or to detect how much the CPU occupancy rate of the corresponding task is. As a result, the real-time system fails to attain a precise balance of the respective tasks and to reflect the CPU occupancy rate in terms of a task design and debugging.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide an apparatus and method that are capable of measuring a CPU task occupancy rate in a real-time system. Another object of the present invention is to provide an apparatus and method that are capable of inspecting if each task is properly executed in its own execution cycle.

In order to achieve at least the above objects in whole or in parts, there is provided an apparatus for measuring a CPU task occupancy rate in a real-time system, including a task register unit for registering a task to be measured in flag bits, a task selecting module for selecting and outputting a bit address of the task having a high priority flag bit among the flag bits, a count signal generating unit for processing the bit address inputted from the task selecting module to generate a count signal. The apparatus also includes a count unit for counting an execution time of the task in accordance with the count signal, and a CPU for setting the flag bit when the task is executed and calculating an execution number. The CPU task occupancy rate is calculated based on a count value of the count unit.

In another aspect of the present invention, an apparatus for measuring a CPU task occupancy rate of a real-time system includes a task register unit for registering a task to be measured in flag bits, a register unit for storing a bit address of the registered task, a task selecting module for selecting and outputting an address of the flag bit having a high priority among the flag bits, which are set in the task register unit. The apparatus further includes a logical operation unit for operating the bit address outputted from the register unit and the address outputted from the task selecting module to generate a count signal, a count unit for counting an execution time of the task in accordance with the count signal, and a CPU setting the flag bit when the task is executed and calculating an execution number. The CPU task occupancy rate is calculated based on a count value of the count unit.

In a further aspect of the present invention, an apparatus for measuring a CPU task occupancy rate of a real-time system includes a task register unit for registering a task to be measured in flag bits, a task selecting module for selecting and outputting an address of the flag bit having a high priority among the flag bits, which are set in the task register unit. There is also provided a decoder for decoding the bit address outputted from the task selecting module to generate a count signal, a count unit for counting an execution time of the task based on the count signal of the decoder, and a CPU setting the flag bit when the task is executed and calculating an execution number. The CPU task occupancy rate is calculated based on a count value of the count unit.

Further, another aspect of the present invention, a method of measuring a CPU task occupancy rate of a real-time system includes registering a task in a flag bit, setting the flag bit when the task is executed, and outputting an address of the flag bit closer to a least significant bit(LSB) among at least one address of at least one set flag bit. The method also includes generating a count signal by decoding the outputted address, and calculating the CPU task occupancy rate by counting an execution time of the task in accordance with the count signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein:

The accompanying drawings, which are included to provide a further understanding of the invention and are incorporated in and constitute a part of this application, illustrate embodiment(s) of the invention and together with the description serve to explain the principle of the invention.

FIG. 2 is a timing diagram illustrating the preferable execution operation of entire tasks in accordance with their priorities in FIG. 1;

FIG. 5 is a timing diagram illustrating an operation of measuring a CPU task occupancy rate of the real-time system of FIG. 4.

DETAILED DESCRIPTION OF PREFERRED EMBODIMENTS

Reference will now be made in detail to the preferred embodiments of the present invention, examples of which are illustrated in the accompanying drawings.

In a real-time system, each task should be executed in every execution cycle. In order to detect if each task is executed in every cycle, it is necessary to count an execution number whenever a task is executed in each cycle. For instance, if cycles of tasks A, B, and C are 10 ms, 20 ms, and 1 sec, respectively, the tasks A, B, and C should be executed 100,000, 50,000, and 1,000 times for an entire execution time of 1000 sec. Hence, the present invention employs a global variable for counting the execution number of tasks and checking the execution number of each of the tasks.

Moreover, the present invention first substantially measures the execution time of each task, and measures a ratio between the measured execution time and a non-execution time. The present invention then calculates the system execution occupancy rate of each task, i.e. a CPU occupancy rate.

Figure 1:
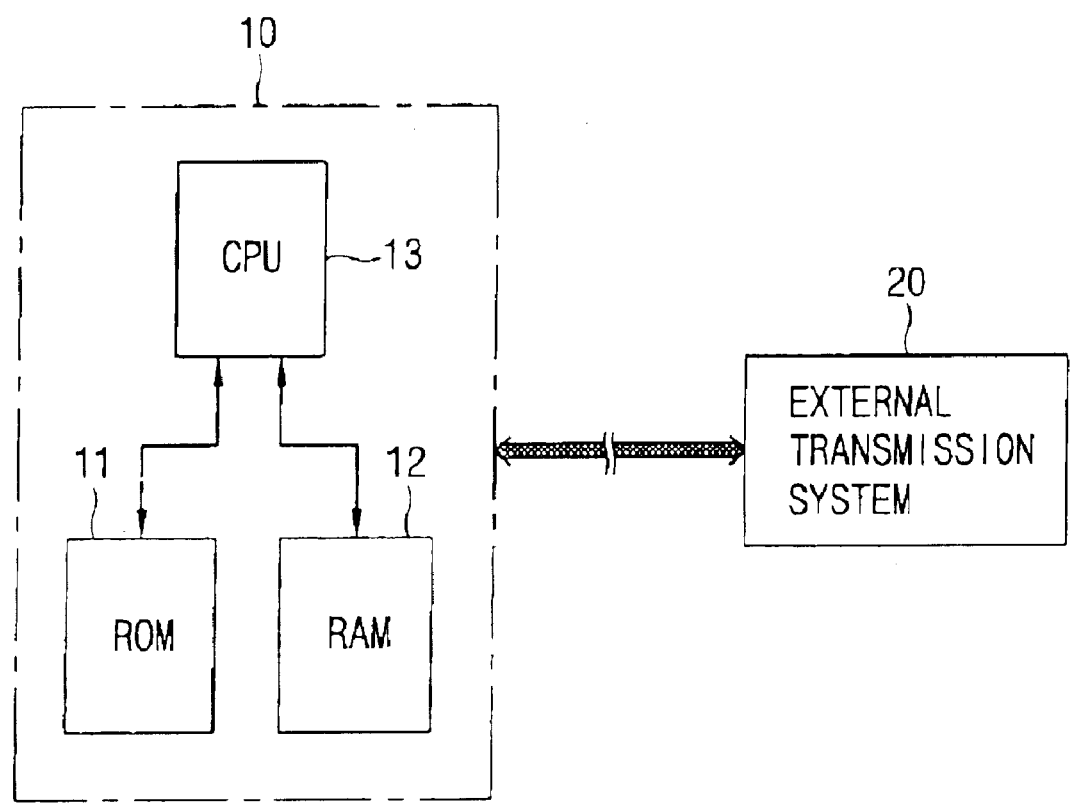
FIG. 1 is a schematic block diagram illustrating a real-time system by RM scheduling according to a related art.
Figure 3A:
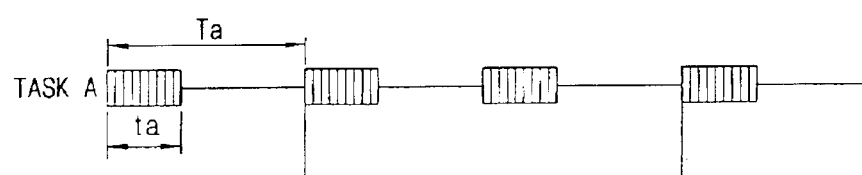
FIG. 3 is a timing diagram illustrating not-preferable execution operation of entire tasks in accordance with their execution cycles in FIG. 2.
Figure 3B:
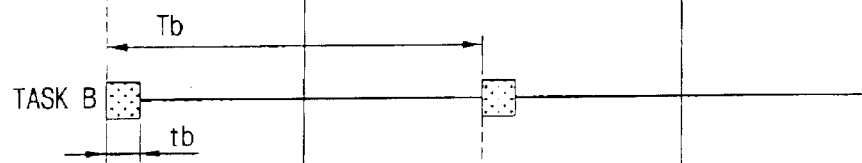
Figure 3C:
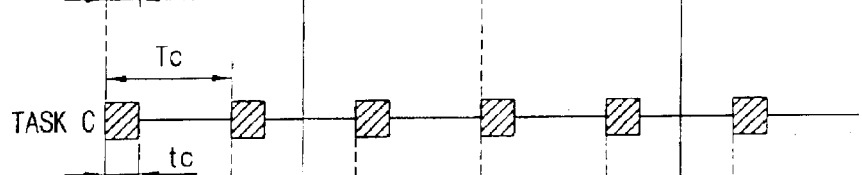
Figure 3D:
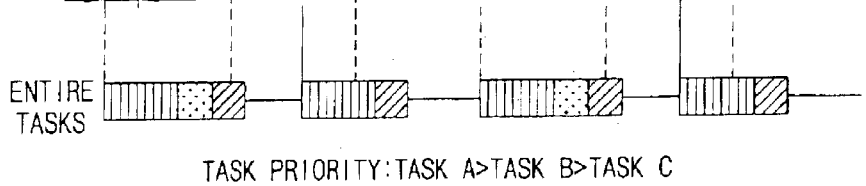
Figure 4:
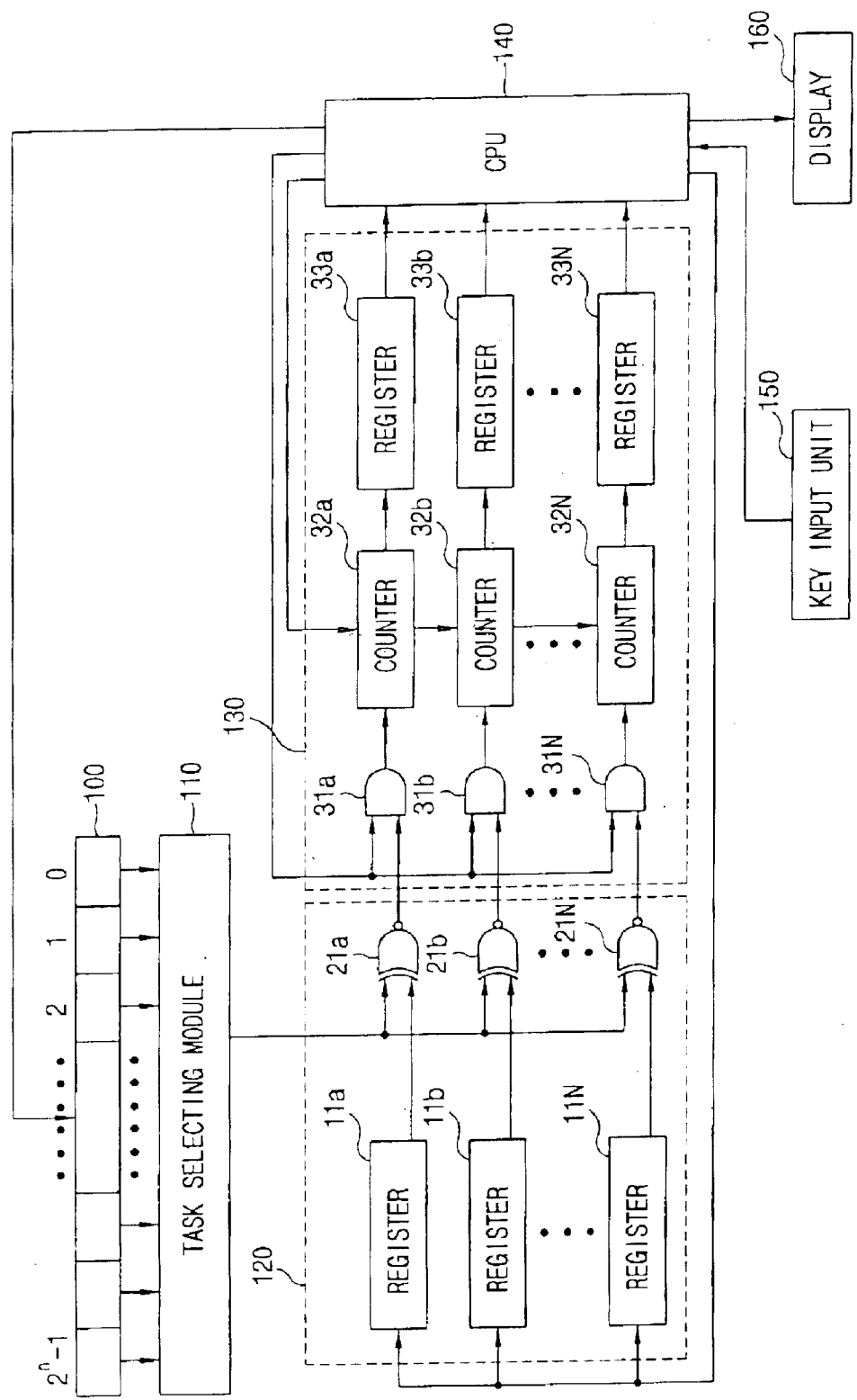
FIG. 4 is a block diagram illustrating an apparatus for measuring a CPU task occupancy rate of a real-time system according to a first preferred embodiment of the present invention.

FIG. 4 is a block diagram illustrating an apparatus for measuring a CPU task occupancy rate in a real-time system according to a first preferred embodiment of the present invention. As shown in FIG. 4, an apparatus for measuring a CPU task occupancy rate in a real-time system includes a task register unit 100 for registering a task to be measured, a task selecting module 110 for selecting and outputting a bit address of a task, which has a high priority among bits in the task register unit 100 set by a CPU 140. The apparatus also includes a count signal generating unit 120 for processing the bit address inputted from the task selecting module 110 so as to generate a count signal, a count unit 130 for counting an execution time of the task in accordance with the count signal of the count signal generating unit 120, and a CPU 140 for setting a task register bit of the task register unit 100 and calculating an execution number and a CPU task occupancy rate based on a count value of the count unit 140. Further, the apparatus includes a key input unit 150 and a display 160, respectively.

The task register unit 100 includes $2^n$ flag bits, from 0 to $2^n-1$ as shown in FIG. 4, for registering the task to be measured in accordance with a priority, and each flag bit is set or reset by the CPU 140 when the task is executed.

The count signal generating unit 120 includes a plurality of registers 11a to 11N storing the bit address of the task registered in the task register unit 100 and a plurality of exclusive NOR gates 21a to 21n outputting the count signal by operating the bit address outputted from the task register unit 100 and registers 11a to 11N. In this case, the plurality of registers 11a to 11N and the plurality of exclusive NOR gates 21a to 21n can be described as a register unit and a logical operation unit, respectively.

The count unit 130 includes a plurality of AND gates 31a to 31N adding output signals of the exclusive NOR gates 21a to 21n and a count enable signal CEN. A plurality of counters 32a to 32N carry out a count operation in accordance with the count signal transferred through the AND gates 31a to 31N, and a plurality of registers 33a to 33N storing count values of the counters 32a to 32N, respectively. Operation of the apparatus for measuring the CPU 140 task occupancy rate in the above-described real-time system is explained by referring to the attached drawings as follows. For convenience of explanation, tasks to be measured are called A, B, and C, respectively.

A user inputs tasks with priorities A>B>C and the tasks A, B, and C to be measured through the key input unit. The CPU 140 allocates the tasks A, B, and C to be measured to the task register unit 100 in accordance with their priorities. Namely, the CPU 140 allocates the tasks A, B, and C to a plurality of the flag bits in accordance with the priorities, respectively. Thus, the bit closer to LSB is allocated to task having a higher priority. As a result, the task A is allocated to the bit 0, while other tasks B and C are allocated to the bit 1 and the bit 2, respectively.

Once the task to be measured is registered, the CPU 140 stores addresses of bit 0 to bit 2 "000", "001", and "010" allocated to the tasks A, B, and C in the registers ha to 11c of the count signal generating unit 120 sequentially. When the registration of the addresses of the tasks to be measured and the corresponding task is completed, the CPU 140 outputs a reset signal RST and a count enable signal CEN to the count unit 130 to initiate reset and enable operations of the counters 32a to 32N. Thus, the tasks A, B, and C as shown in FIGS. 5A–5C are executed in accordance with the priorities.

Once the execution of the tasks is initiated, the CPU 140 sets bit 0–bit 2 of the task register unit 100 as "1" while the tasks A, B, and C are being executed. When the execution is completed, the CPU 140 resets the bits as "0". Specifically, when the task execution is initiated, the CPU 140, as shown in FIG. 5G, sets the bit 2 allocated to the task C and the task selecting module 110, as shown in FIG. 5H, and finally outputs the address "010" of bit 2.

The count signal generating unit 120 receives the address from the task selecting module 110 to select counters 32a to 32N to count a task execution time. Namely, the exclusinve NOR gates 21a to 21N of the count signal generating unit 120 generate count signals when the same address is inputted from the task selecting module 110 and registers 11a to 11N.

When the address output from register 11c is equal to the address output from the task selecting module 110, the exclusive NOR gate 21c, as shown in FIG. 5K, generates a count signal of high level. Further, the rest of the exclusive NOR gates 21a, 21b, 21d, . . . , and 21N, as shown in FIGS. 5I and 5J, generate count signals of a low level. Hence, the count signal of a high level is inputted to the counter 32c through the AND gate 31c of the count unit 130. Subsequently, the counter 32c counts the execution time of the task C and stores the counted execution time in the register 33c while the count signal of high level is being inputted, but the rest counters 31a, 31b, 31d, . . . , 31N fail to execute the count operation.

Thereafter, when the execution time of the task B, which has a high priority as shown in FIG. 5F, emerges diving the execution of the task C, the CPU 140 sets the "bit 1". Bit 1 and bit 2 may be set simultaneously. However, since the task selecting module 110 outputs the address of a flag bit allocated to the task having a high priority, the address of the flag bit dose to LSB, for example, the address "001" of bit 1, as shown in FIG. 5H, is outputted from the task selecting module 110. Therefore, the exclusive NOR gate 21b of the count signal generating unit 120 generates the count signal of high level, and the counter 32b counts the execution time of the task B in order to store the counted execution time in the register 33b.

Moreover, as shown in FIG. 5E when the execution time of the task A having high priority emerges during the execution of the task B, the CPU 140 sets the bit 0 to all of the three bits, bit 0, bit 1, and bit 2. At the same rime, the task selecting module 110 outputs the address "000" of bit 0 allocated to the task A among the three bits. Therefore, the exclusive NOR gate 21a generates the count signal of high level like in FIG. 5I, and the counter 32a counts the execution time of the task A while the count signal is being inputted and the counted execution time stored in the register 33a.

Thereafter, when the execution of the task A is ended, the task selecting module 110 outputs the address "001" of bit 1, which maintains the current setting state so as to enable the counter 32b to count the execution time of task B. The CPU 140 failed to fully execute task B previously. Furthermore, when the execution of the task B is ended, the task selecting module 110 outputs the address "010" of bit 2, which maintains the setting state so as to enable the counter 32c to count the execution time of task C. The CPU 140 also failed to fully execute task C previously. Thus, the present invention stores the address of the task to be measured in a predetermined register, then actuates the counters 32a to 32N when the flag bit having the same address stored in the register is set in the task register unit 100 to count the execution times of the tasks A, B, and C.

When the execution of the tasks A, B, and C is ended completely, the CPU 140 reads the count values stored in the registers 33a to 33N of the count unit 130, and compares the corresponding count value to the measured time in order to calculate the CPU occupancy rates of the respective tasks A, B, and C. In this case, a ratio between the count value and measured time is the CPU occupancy rate for each of the tasks A, B, and C. Further, a total CPU occupancy rate of the entire tasks can be obtained by adding the CPU occupancy rates of tasks A, B, and C altogether. After completion of calculation, the CPU 140 shows the CPU occupancy rates of the respective tasks and the total CPU occupancy rate and information of whether each of the tasks is executed in every cycle on the display 160.

Figure 6:
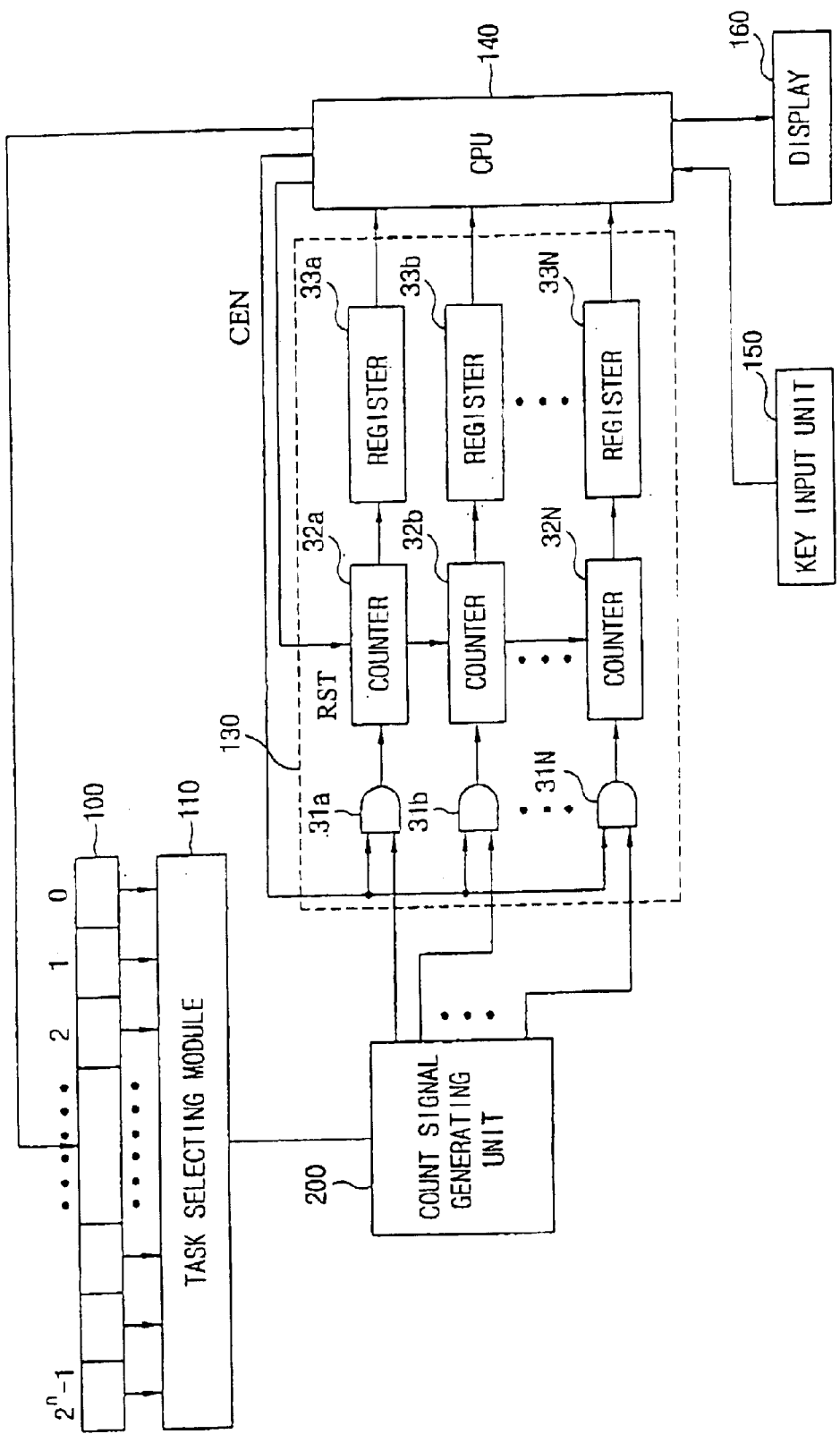
FIG. 6 illustrates a block diagram of an apparatus for measuring a CPU occupancy rate of a task in a real-time system according to a second embodiment of the present invention.

FIG. 6 is a block diagram illustrating an apparatus for measuring a CPU task occupancy rate of a real-time system according to another preferred embodiment of the present invention. In this second preferred embodiment, a count signal generating unit 200 is utilized as a decoder. Components equal to those in the first preferred embodiment of the present invention are indicated by the same numerals of the first embodiment.

Referring to FIG. 6, the count signal generating unit 200 includes a decoder that selects the counters 31a to 31N to count the execution time of tasks in accordance with the addresses inputted from the task selecting module 110. When a bit address is inputted from the task selecting module 110, the count signal generating unit 200 decodes the corresponding address to generate the count signal. The corresponding count signal is inputted to the counters 32a to 32N through the AND gates 31a to 31N of the count unit 130. Thereafter, the counters 32a to 32N, which receive count signals of high level, are enabled to count the execution time of the currently executed task.

Accordingly, the apparatus for measuring the CPU task occupancy rate of a real-time system according to the present invention measures the CPU occupancy rates of respective tasks, thereby, the task design and debugging can be performed more effectively. Moreover, the present invention measures the CPU task occupancy rate precisely to be applied to the real-time system. Therefore, the present invention is able to distribute the CPU occupancy rates with other tasks effectively even if plenty of tasks are loaded on the task routine and required additional routines. Besides, the present invention is able to improve the precision of the task handling.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for measuring a CPU occupancy rate in a real-time system, comprising:
    a task register unit configured for registering tasks to be measured in flag bits;
    a task selecting module configured for selecting an address of a flag bit having a high priority among the set flag bits;
    a count signal generating unit configured for processing the bit address inputted by the task selecting module and for generating a count signal;
    a count unit configured for counting an execution time of the task in accordance with the count signal; and
    a CPU for setting the flag bit when the task in executed and for calculating an execution number and the CPU occupancy rate of the task based on a count value generated by the count unit,
    wherein the count unit comprises:
        a plurality of logic gates transferring the count signal in accordance with an enable signal;
        a plurality of counters carrying our a count operation in accordance with the count signal transferred from the logic gates; and
        a plurality of registers storing output values of the counters.

2. The apparatus of claim 1, wherein the task register unit comprises $2^n$ flag bits for registering the tasks to be measured in accordance with priority.

3. The apparatus of claim 1, wherein the task having the high priority is allocated to a least significant flag bit of the task register unit.

4. The apparatus of claim 1, wherein the count signal generating unit comprises:
    a register unit configured for storing the bit addresses of the tasks registered in the task register unit; and
    a logical operation unit configured for outputting the count signal based on the bit address selected by the task selecting module and a corresponding bit address stored in the register unit.

5. The apparatus of claim 4, wherein the logical operation unit generates the count signal when the same address is outputted from the register unit and the task selecting module.

6. The apparatus of claim 4, wherein the logical operation unit comprises a plurality of exclusive NOR gates.

7. The apparatus of claim 1, wherein the plurality of logic gates include AND gates.

8. The apparatus of claim 1, wherein the count signal generating unit comprises a decoder.

9. An apparatus for measuring a CPU occupancy rate in a real-time system, comprising:
    a task register unit configured for registering tasks to be measured in flag bits;
    a register unit configured for storing bit addresses of the flag bits of the registered tasks;
    a task selecting module configured for selecting and outputting an address of a flag bit corresponding to a task having a high priority among the set flag bits in the task register unit;
    a logical operation unit configured for generating a count signal based on the bit address selected by the task selecting module and a corresponding bit address outputted from the register unit;
    a count unit configured for counting an execution time of the task in accordance with the count signal; and
    a CPU for setting the flag bit when the task is executed and for calculating an execution number and the CPU occupancy rate of the task based on a count value generated by the count unit,
    wherein the count unit comprises:
        a plurality of logic gates transferring the count signal in accordance with an enable signal;
        a plurality of counters carrying out a count operation in accordance with the count signal transferred through the logic gate; and
        a plurality of registers storing output values of the counters.

10. The apparatus of claim 9, wherein the logical operation unit generates the count signal when the same address is outputted from the register unit and the task selecting module.

11. The apparatus of claim 10, wherein the logical operation unit comprises a plurality of exclusive NOR gates.

12. The apparatus of claim 9, wherein the plurality of logic gates include AND gates.

13. An apparatus for measuring a CPU occupancy rate in a real-time system, comprising:
    a task register unit configured for registering tasks to be measured in flag bits;
    a task selecting module configured for selecting and outputting an address of a flag bit having a high priority among the set flag bits in the task register unit;
    a decoder configured for decoding the bit address outputted from the task selecting module to generate a count signal;
    a count unit configured for counting an execution time of the task in accordance with the count signal of the decoder; and
    a CPU for setting the flag bit when the tak is executed and for calculating an execution number of the CPU occupancy rate of the task based on a count value generated by the count unit,
    wherein the count unit comprises:
        a plurality of logic gates generating the count signal and an enable signal;
        a plurality of counters carrying out a count operation in accordance with the count signal transferred through the logic gates; and
        a plurality of registers among output values of the counters.

14. The apparatus of claim 13, wherein the plurality of logic gates include AND gates.

15. A method of measuring a CPU occupancy rate in a real-time system, comprising:
    registering a task in a flag bit;
    setting the flag bit when the task is executed;
    outputting and allocating an address of the flag bit closer to a least significant bit (LSB) of at least one set flag bit;
    generating a count signal by decoding the outputted address;

calculating the CPU occupancy rate of the task by counting an execution time of the task in accordance with the count signal, wherein the method further includes:
generating the count signal and an enable signal by a plurality of logic gates;
carrying out a count operation by a plurality of counters in accordance with the count signal transferred through the logic gates; and
storing output values of the counters in a plurality of registers.

16. The method of claim 15, wherein the logic gates include AND gates.

* * * * *